Dec. 29, 1964  H. I. JEWETT  3,163,529
FLUID PRESSURE MEASURING ELEMENT
Filed April 29, 1960  2 Sheets-Sheet 1
Fig. 3.
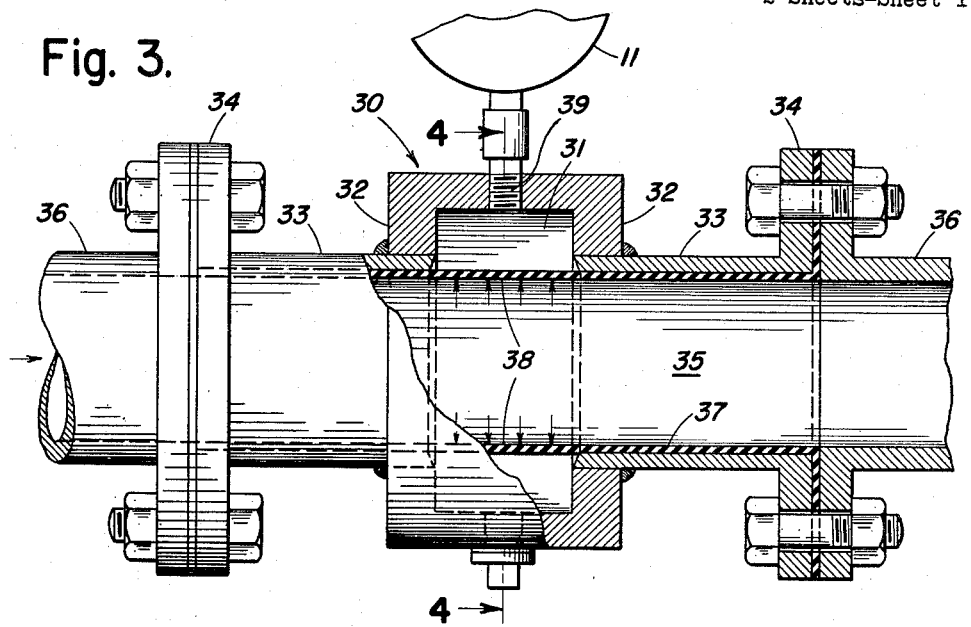
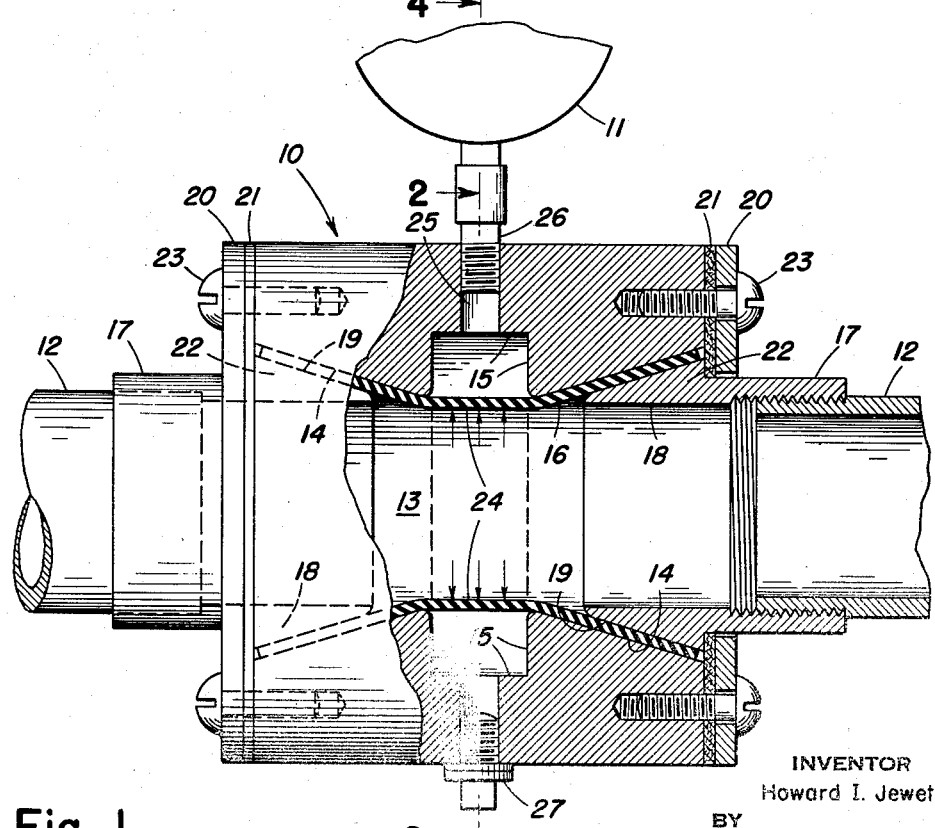
Fig. 1.
INVENTOR
Howard I. Jewett
BY
AGENT Dec. 29, 1964   H. I. JEWETT   3,163,529
FLUID PRESSURE MEASURING ELEMENT
Filed April 29, 1960   2 Sheets-Sheet 2

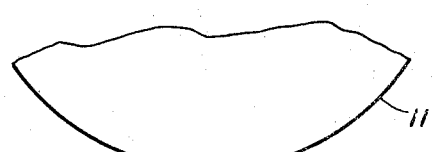

INVENTOR
Howard I. Jewett
BY
*H. L. Gammons*
AGENT

United States Patent Office 3,163,529
Patented Dec. 29, 1964

3,163,529
FLUID PRESSURE MEASURING ELEMENT
Howard I. Jewett, Westfield, N.J., assignor to National Lead Company, New York, N.Y., a corporation of New Jersey
Filed Apr. 29, 1960, Ser. No. 25,768
3 Claims. (Cl. 73—406)

The present invention relates in general to pressure measuring devices and more particularly to a pressure measuring unit of the sealed gauge type for measuring fluid pressures in a pipeline.

Numerous sealed gauges have been designed heretofore for measuring fluid pressures in pipelines and in general those gauges which employ a sealed system are mounted on a flanged-T of the pipeline. However, there are numerous disadvantages to this type of construction among which may be mentioned high cost, flow restrictions and built-in pockets and recesses which cause plugging and inaccurate measurements. Moreover, these and similar wafer-type sealed systems not only require special and hence expensive fittings, but as designed are capable of measuring pressures only at localized points in the pipeline. Hence, there is need for a pressure measuring device for pipelines which is inexpensive, which is of simple compact construction, which may be readily installed in a pipeline and which will give continuous, accurate pressure readings for solids-free liquids, slurries, caustics, acids, and the like.

An object of the present invention is to provide an improved sealed pressure measuring unit which is economical, and of relatively simple, long-wearing and reliable construction.

A further object of the invention is to provide a sealed pressure measuring unit which offers no obstructions to the flow of solids-free liquids or slurries through the pipeline and which is capable of giving continuous, accurate pressure readings over a wide temperature range.

A still further object is to provide a sealed pressure measuring unit having a sealed pressure gauge, the unit being so designed that it can be readily installed in-line in a pipeline, and may be used in a pipeline carrying acids, corrosive fluids, etc., without damage to the internal elements of the gauge.

These and other objects, features and advantages of the invention will be described in greater detail below and illustrated by the accompanying drawings in which:

FIG. 1 is a side elevation partly in section of the sealed pressure measuring unit of this invention connected in a pipeline.

FIG. 3 is a side elevation in section of a modification of the sealed pressure measuring unit.

Figure 4:
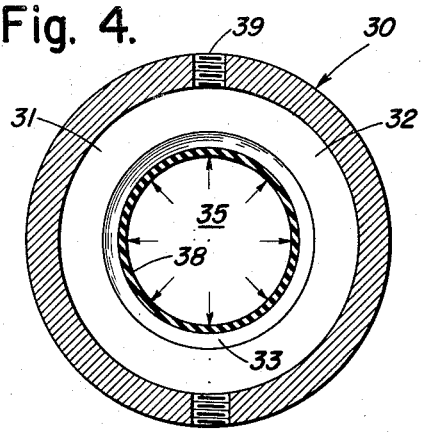
FIG. 4 is an end elevation of the modified unit on line 4—4 of FIG. 2.

Referring to the drawings, the sealed pressure measuring unit of this invention comprises two principal elements, namely, a body member 10 and a pressure measuring element or gauge 11, the term "unit," as hereinabove used, meaning the integrated assembly of the body member 10 and the pressure measuring element 11. The body member 10 may be formed of various corrosive resistant materials as for example, brass, lead, plastic corrosive resistant metal alloys, hard rubber or the like. The pressure measuring element 11 may be any conventional type of gauge as for example, a glass gauge, or a conventional dial gauge, and for purposes of illustration the element 11 is shown as a dial type pressure gauge.

Figure 2:
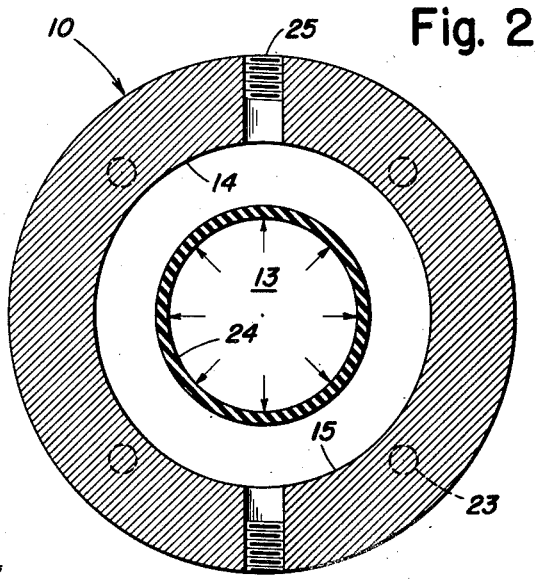
FIG. 2 is an end elevation of the unit on section line 2—2 of FIG. 1.

As indicated in FIGS. 1 and 2 of the drawings the body member 10 is, in accordance with the objects of the invention, designed to be mounted between the opposed ends of two pieces of pipeline 12—12. To this end the body member 10, which is preferably in the form of a cylindrical block having an axial bore 13 extending longitudinally therethrough is provided at its opposite ends with countersinks 14—14, respectively, the inner extremities of which intersect an annular groove 15 formed in the wall of the bore 13 substantially intermediate its opposite ends. A flexible tube 16, as for example, soft rubber or plastic tubing, the length and outside diameter of which correspond substantially to the corresponding dimensions of the bore 13 is inserted in the bore with its intermediate portion spanning the annular groove 15. The inside diameter of the rubber or plastic tubing corresponds substantially to the inside diameter of the pipeline 12. Pipe couplings 17—17 are adapted to connect opposite ends, respectively, of the body member 10 to the opposed ends of the pipelines 12—12 and to this end each coupling 17 is formed at its inner end with a shouldered cone-shaped head 18 adapted to engage in corresponding ends of the flexible tubing 16, the conical surface 19 of each head 18 being tapered to mate with the taper of the corresponding countersink 14; and at its outer end with internal threads for threaded engagement with the corresponding externally threaded pipe end 11. The head-ends of the pipe couplings are adapted to be secured with a fluid tight joint in the corresponding ends of the body member by disc-shaped holding plates 20—20 between which and the corresponding ends of the body member 10 are gaskets 21—21. Each holding plate has a center aperture through which the outer end of the corresponding pipe coupling projects. The diameter of the center aperture of each holding plate is, however, less than the diameter of the shoulder 22 of the corresponding coupling head 18 as a consequence of which when the holding plates 20 are screwed down tightly against the shoulders of the pipe couplings by machine screws 23, or the like, the conical heads of the pipe couplings are forced into the corresponding ends of the flexible rubber tubing to expand the latter into conformity with the mating conical surfaces 19—19 of the coupling heads 18—18 and the countersinks 14—14 of the body member 10 to form a fluid tight seal therebetween. The intermediate portion of the flexible tubing is thus drawn tightly across the annular groove 15 to form an annular flexible membrane 24 thereover, which membrane, in conjunction with the non-compressible fluid hereinafter described, is hereinafter referred to as the fluid pressure responsive means; and to effectively seal the groove 15 from the fluids passing through the bore 13.

To mount the body member 10 in line between the opposed ends 12—12 of the pipeline, it is only necessary to threadedly engage the ends of the pipeline in the corresponding internally threaded ends of the pipe couplings 17—17.

The body member 10 is adapted to carry the sealed pressure gauge 11 as an integral part thereof, the entire assembly being hereinafter referred to as a unitary pressure gauge structure; and to this end a hole 25 is drilled and tapped radially in one wall of the body member 10 to intersect the annular sealed groove, the pressure gauge 11 being mounted directly on the body member by engaging its hollow stem 26 in the tapped hole 25.

The sealed annular groove 15 is adapted to be filled with a non-compressible fluid, as for example, water, silicon oils (for high temperature applications), mineral oils, or the like, from which all air is excluded. The fluid is conveniently introduced into the annular sealed groove 15 through a radial hole provided with a filling plug 27 and is used, in conjunction with the flexible membrane 24, to transmit changes in fluid pressure in the bore 13 of the unit to the gauge 11.

In operation, the unitary structure is assembled between the opposed ends of a pipeline as indicated above. Immediately with the flow of fluid under pressure through the unit, the pressure of the fluid will distort the flexible membrane 24 the distortion of which displaces the fluid in the sealed groove thereby causing the internal elements, i.e., the Bourdon tube of the sealed meter, to respond thereby visibly recording the pressure of the fluid passing through the unit.

A modification of the above described unit is shown in FIGS. 3 and 4, wherein a cylindrical body member 30 is made hollow so as to provide an internal annular chamber 31. Axially aligned apertures are formed in opposite faces 32—32 of the body member in which apertures flanged sleeves 33—33 are welded or otherwise fixedly secured. The inner walls of the sleeves form the axial bore 35 of the unit. The unit is adapted to be assembled in a pipeline by engaging the flanged ends 34—34 of the sleeves on opposed flanged ends of the pipeline 36—36.

Extending through the assembled body member 30 and its flanged collars is a flexible tube 37 formed of soft rubber or plastic tubing secured to the inner walls of the collars by an adhesive or by vulcanizing. A similar soft rubber or plastic material is applied to the outer surfaces of the flanges 34—34 so that fluid tight seals will be formed between the flanges 34—34 and the flanges of the pipe.

A portion of the flexible tubing which spans the annular chamber 31 seals the latter from a fluid passing through the axial bore 35 of the unit and constitutes, in conjunction with the non-compressible fluid, the annular fluid pressure responsive means 38 of the unit.

As in the preceding unit a non-compressible fluid fills the sealed annular chamber 31 for transmitting the deflections of the fluid pressure responsive means 38 to the sealed pressure gauge 11 mounted integrally on the body member in direct communication with the sealed annular chamber 31 by way of the radial passageway 39.

The unitary pressure gauge structure of FIGS. 3 and 4 is adapted to be assembled between the opposed flanged ends of a pipeline as indicated clearly in the drawing—and in operation immediately with the flow of fluid under pressure through the unit, the pressure of the fluid distorts the fluid pressure responsive means 38 and this distortion displaces the fluid in the sealed annular chamber 31 causing the internal elements of the sealed meter to respond and thereby visibly recording the pressure of the fluid passing through the unit.

Figure 5:
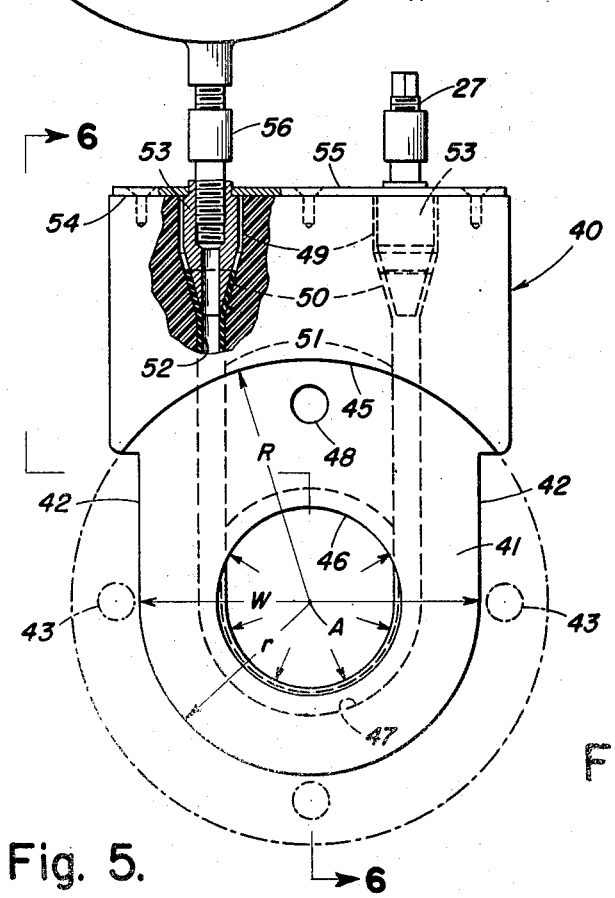
FIG. 5 is an end elevation of another modification of the sealed pressure measuring unit end; and, FIG. 6 is a side elevation of the unit of FIG. 5.
Figure 6:
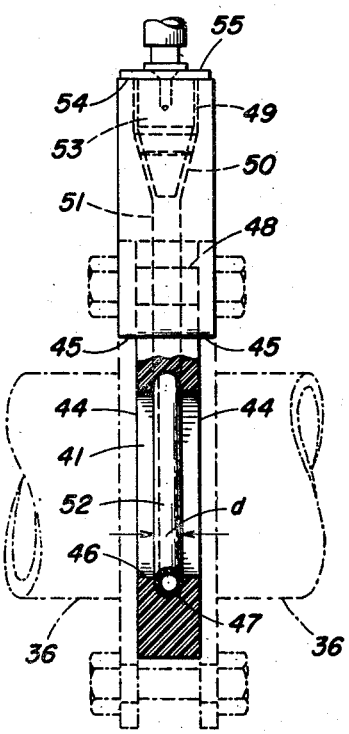

A further modification of the unit is shown in FIGS. 5 and 6 in which the body member 40 is formed of a plastic material, such as polyvinyl chloride, and is designed to be readily assembled between the flanges of two aligned sections of pipeline 36—36. To this end, the body member 40 comprises a substantially rectangular plastic block, the overall dimensions of which are determined by the diameter of the pipe flanges to which it is to be fastened the thickness of the block being sufficient to provide the required structural strength as well as the area necessary to accommodate the fluid pressure responsive means hereinafter described. The lower section 41 of the block is reduced in width, as indicated in FIG. 5, such that the distance W between its parallel sides 42—42 is slightly less than the distance separating the diametrically opposite bolt holes 43—43 of a standard pipe flange. Moreover, opposite faces 44—44 of the lower section 41 of the body member are recessed with respect to the upper section of the body member to a depth corresponding substantially to the thickness of a standard pipe flange the shoulders 45—45 of the recessed faces 44—44 (see FIG. 6) being struck on an arc having a radius R corresponding to the radius of a standard pipe flange. The axis A of the radius R is located on the longitudinal axis of the block and at a distance $r$ from the bottom end thereof, the distance $r$ being equal to $W/2$. In this connection, the bottom edge of the block may be rectangular but is preferably rounded off with a radius $r$ from the axis at A.

Formed in the lower section 41 of the body member is an aperture 46, the center of which is at A and the radius of which corresponds substantially to the inside diameter of the pipeline in which the unit is to be installed. Formed in the periphery of the aperture 46 is a groove 47 which is circular in cross section as shown in FIG. 6, the axis of the groove 47 being below the periphery of the aperture 46. The distance of the axis of the groove 47 below the periphery of the aperture 46 is not critical nor limiting but is preferably such that the fluid pressure responsive means that is adapted to seat in the groove 47 will be deformed by the pressure of the fluid flowing through the aperture but will not restrict the flow. Located on the longitudinal axis of the body member above the aperture 46 is a bolt hole 48 which is used to align the body member with a bolt hole in the flanges of respective sections of the pipeline when the unit is assembled therein as hereinafter described.

The upper section of the body member is provided with two holes 49—49 drilled into the upper edge thereof in spaced parallel relationship parallel to and on opposite sides respectively of the longitudinal axis of the body member each hole being adapted to accommodate suitable fittings of the fluid pressure responsive means hereinafter described. Formed in the bottom of each hole 49 is a countersink 50. Extending downwardly through the countersinks 50—50 and coaxial with the respective holes 49—49 are passages 51—51, respectively, the lower ends of which intersect diametrically opposite sides, respectively, of the aperture 46 tangentially thereto. More particularly, the longitudinal axes of the passages 51—51 are spaced apart laterally such that the longitudinal axis of each passage coincides with the axis of the groove 47 at its point of tangency therewith, the diameter of each passage being substantially equal to the diameter of the groove 47.

The fluid pressure responsive means is designated at 52 and comprises a flexible hose or tube preferably formed of a non-corrosive material such as plastic. The outside diameter of this tube corresponds substantially to the diameter of the groove 47 in the periphery of the aperture 46. The tube 52 is assembled in the lower portion of the groove 47 with its two free ends extending upwardly into the tangential passages 51—51, with their upper ends pulled onto and expanded by the conical ends of tube fittings 53—53. The conical ends of these fittings are adapted to be drawn down on the countersinks 50—50 of the respective holes 49—49 thereby to form fluid tight joints between the conical ends of the fittings and the corresponding ends of the tube 52. To this end each fitting, at assembly, extends slightly above the top surface 54 of the body member so as to be engaged by a metal cover plate 55 having apertures therein in alignment with the fittings 53—53 but of slightly smaller diameter. Thus, when the cover plate 55 is applied and screwed down tightly on the upper edge of the body member 40 the plate engages and forces the fittings 53—53 and hence the conical ends thereof downwardly against the countersink 50—50 thereby compressing the expanded ends of the tube 52 and forming fluid tight joints therebetween. This construction permits a length of tube 52 corresponding to substantially ⅔ the periphery of the aperture 46 to be exposed to the flow of fluid through the pressure measuring unit.

Mounted on the upper edge of the body member 40 is the pressure gauge 11 of the type designed for use in sealed pressure measuring systems, the hollow stem of which is connected by means of a coupling 56 with one of the fittings 53. The second fitting 53 is provided with a removable filling plug 27.

For the fluid pressure responsive means, i.e., the tube 52, to operate so as to actuate the gauge 11 of the pressure measuring unit the tube is filled with a noncompressible fluid, as for example, water, silicone oils, mineral oils, or the like, from which all air is excluded. The fluid is introduced into the tube by removing the plug 27 and introducing the fluid into the tube and the internal elements (Bourdon tube) of the gauge. After these have been filled with fluid and all air, if any, removed therefrom the plug 27 is replaced to seal the system. If desired, the fluid in the tube may be put under a slight initial pressure depending upon the pressure range of the fluid to be measured.

The body member 40 is adapted to be readily assembled between the flanges of two sections of pipe 36—36 (see FIG. 6) by engaging the respective pipe flanges against the corresponding recessed faces 44—44 of the body member with a portion of each flange fitting snugly against the corresponding shoulders 45—45 thereof. Bolts are then passed through the aligned bolt holes of the respective flanges, including the bolt hole 48 in the body member and nuts are assembled thereon to draw the respective pipe flanges tightly against the recessed faces of the body member and form fluid tight joints therewith. In this relatively simple manner, the sealed pressure measuring unit is made an integral part of the pipeline with the axis of the aperture 46 in the body member coincident with the longitudinal axis of the pipeline.

While the unit is described and illustrated as being maintained in-line in a pipeline the unit may be assembled against the blind flange of a pipeline, in the spool-piece of a tank or in other similar installations.

To further illustrate the invention a unit similar to that described above in FIGS. 5 and 6 was installed in-line in a 3 inch pipeline. The unit was formed of polyvinyl chloride plastic. The diameter $(d)$ of the groove in the aperture 46 of the unit was $9/16$ inch with the longitudinal axis of the groove located $3/10$ $(d)$ inch below the periphery of the aperture such that when the flexible tube 52 was assembled therein substantially $1/3$ $(d)$ of the tube diameter extended above the periphery of the aperture. The length of the tube exposed corresponded to substantially $2/3$ the periphery of the aperture 46. The tube 52 was filled with water. After calibrating the pressure gauge 11 by standard calibrating means, the unit was operated for 100 hours during which time the pressure in the pipeline was varied from 0 to 160 p.s.i. The recorded gauge readings were within 0.5% accuracy throughout the entire pressure range.

From the foregoing description, it is manifest that the pressure gauge units of this invention are of relatively simple construction, offer substantially no obstruction to the flow of fluid through the pipeline and embody no recesses or pockets which would disturb the streamline flow or effect an accumulation of solids within the pressure measuring unit. Further, all of the component parts exposed to the fluid passing through the units may be formed of a non-corrosive, long wearing, relatively inexpensive material; and in each instance the flexible fluid pressure responsive means extends at least 240° to as much as 360° around the inner wall of the axial bore or passage way through which the fluid being measured flows as a consequence of which that surface area of the pressure responsive means that is exposed to the pressure of the fluid is unusually large—yet offers no obstruction to the flow of the fluid through the unit. Hence, the pressure gauge units of this invention are not only highly sensitive to pressure changes but are applicable to installations wherein the pressure to be measured may vary over a relatively wide range including installations wherein the meter itself is located at a distance remote from the pressure responsive unit and is connected thereto by a relatively long capillary tube. Moreover, by providing pressure responsive means characterized by a relatively large area responsive to pressure variations accurate pressure readings can be made despite localized air pockets in the line. And further, the units that were made and tested in carrying out the instant invention were produced at considerably less cost than conventional sealed pressure measuring units.

The invention may be carried out in other specific ways than those herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A unitary pressure measuring structure in combination with a conduit through which a fluid under pressure flows for continuously indicating fluid pressure in said conduit, said unitary structure comprising; a body member having an axial bore extending therethrough, an annular recess intersecting the wall of said axial bore, said annular recess being in a plane substantially at right angles to the longitudinal axis of said bore, fluid pressure responsive means comprising a cylindrical resilient sleeve mounted in said bore, said resilient sleeve being constructed and arranged to span the intersection of said annular recess with said bore and to engage the walls of said bore at opposite sides of said intersection with a fluid tight seal thereby forming a sealed annular chamber within the wall of said body member, said annular chamber being sealed from the flow of fluid through said body member, an incompressible fluid filling said sealed annular chamber, a pressure measuring device, means constructed and arranged to connect said pressure measuring device to said body member, a passage in said body member arranged to intersect said sealed annular chamber, means constructed and arranged to connect said pressure measuring device with said passage whereby variations in the pressure of said incompressible fluid in said sealed annular chamber are transmitted to said pressure measuring device, and fluid conduits connected to said body member at opposite ends respectively of said bore, the internal diameter of said conduits being substantially equal to the internal diameter of said resilient sleeve, whereby the flow of fluid through said conduits and the said resilient sleeve of said body member is substantially laminar, said resilient sleeve being adapted to deflect in response to the pressure of the fluid flowing therethrough and thereby exert pressure on the incompressible fluid in said sealed annular chamber.

2. A unitary pressure gauge structure in combination with a conduit through which a fluid under pressure flows for continuously indicating fluid pressure in said conduit, said unitary structure comprising; a body member having a cylindrical axial bore extending therethrough, an annular recess intersecting the wall of said axial bore said annular recess being in a plane substantially at right angles to the longitudinal axis of said bore, fluid pressure responsive means comprising a cylindrical resilient sleeve mounted in said bore, said resilient sleeve being constructed and arranged to span the intersection of said annular recess with said bore and to engage the walls of said bore at opposite sides of said intersection with a fluid tight seal thereby forming a sealed annular chamber within the wall of said body member, said annular chamber being sealed from the flow of fluid through said body member, an incompressible fluid filling said sealed annular chamber, a pressure gauge constructed and arranged to be secured to said body member, a passage in said body member constructed and arranged to connect said pressure gauge to said sealed annular chamber whereby variations in the pressure of said incompressible fluid in said sealed annular chamber are transmitted to said pressure gauge, and fluid conduits connected to said body member at opposite ends respectively of said bore, the internal diameter of said conduits being substantially equal to the internal diameter of said resilient sleeve with the inner surface of said resilient sleeve and the inner surfaces of said conduits being substantially continuous, whereby the flow of fluid through said conduits and the said resilient sleeve of said body member is substantially laminar, said resilient sleeve being adapted to deflect in response to the pressure of the fluid flowing therethrough and thereby exerting pressure on the incompressible fluid in said sealed annular chamber.

3. A unitary pressure gauge structure in combination with a conduit through which a fluid under pressure flows for continuously indicating fluid pressure in said conduit, said unitary structure comprising a body member having a cylindrical axial bore extending therethrough said bore having outwardly flaired conical enlargements at opposite ends thereof, an annular recess intersecting the wall of said axial bore, said annular recess being in a plane substantially at right angles to the longitudinal axis of said bore, fluid pressure responsive means comprising a cylindrical resilient sleeve mounted in said bore, said resilient sleeve being constructed and arranged to span the intersection of said annular recess with said bore and to engage the walls of said bore at opposite sides of said intersection with a fluid tight seal thereby forming a sealed annular chamber within the wall of said body member, said annular chamber being sealed from the flow of fluid through said body member, an incompressible fluid filling said sealed annular chamber, a pressure gauge constructed and arranged to be secured to said body member, a passage in said body member constructed and arranged to connect said pressure gauge to said sealed annular chamber whereby variations in the pressure of said incompressible fluid in said sealed annular chamber are transmitted to said pressure gauge, and fluid conduits adapted to be connected at opposite ends respectively of said cylindrical bore, the internal diameter of said conduits being substantially equal to the internal diameter of said resilient sleeve, and connecting means for each conduit comprising a nipple secured at its outer end to its respective conduit and provided at its inner end with a frusto-conical head tapered to correspond to the conical enlargement at the corresponding end of said axial bore, and apertured face plates on opposite faces of said body member each face plate being arranged to engage the corresponding nipple and hold it securely in the corresponding end of said axial bore with the frusto-conical head of the nipple engaged in and holding the corresponding end of said resilient sleeve in sealed engagement with the corresponding conical enlargement of said bore, the portion of said resilient sleeve opposite said annular recess being adapted to deflect in response to the pressure of the fluid flowing through said resilient sleeve thereby exerting pressure on the incompressible fluid in said sealed annular chamber.

References Cited in the file of this patent

UNITED STATES PATENTS

| | | |
|---|---|---|
| 1,861,999 | Bowlus | June 7, 1932 |
| 2,274,479 | Inderdohnen et al. | Feb. 24, 1942 |
| 2,804,773 | Domingo et al. | Sept. 3, 1957 |
| 2,859,013 | Peterson | Nov. 4, 1958 |
| 2,930,236 | Taber | Mar. 29, 1960 |

FOREIGN PATENTS

| | | |
|---|---|---|
| 620,173 | Great Britain | Mar. 21, 1949 |